US006272247B1

(12) United States Patent
Manickam et al.

(10) Patent No.: US 6,272,247 B1
(45) Date of Patent: Aug. 7, 2001

(54) ROTATION AND SCALE INVARIANT IMAGE FINDER

(75) Inventors: Swaminathan Manickam, Wilmington; Scott D. Roth, Boxford; Thomas W. Bushman, Marblehead, all of MA (US)

(73) Assignee: Datacube, Inc., Danvers, MA (US)

( * ) Notice: Subject to any disclaimer, the term of this patent is extended or adjusted under 35 U.S.C. 154(b) by 0 days.

(21) Appl. No.: 09/314,730

(22) Filed: May 18, 1999

Related U.S. Application Data

(60) Provisional application No. 60/085,862, filed on May 18, 1998.

(51) Int. Cl.[7] .................................................. G06K 9/64
(52) U.S. Cl. ............................................................ 382/217
(58) Field of Search ................................ 382/217, 155, 382/159, 209, 215, 216, 218, 296, 297, 298

(56) References Cited

U.S. PATENT DOCUMENTS

| | | | |
|---|---|---|---|
| 4,538,227 | 8/1985 | Toraichi et al. | 364/414 |
| 4,720,871 | * 1/1988 | Chambers | 382/278 |
| 5,067,162 | 11/1991 | Driscoll, Jr. et al. | 382/5 |
| 5,146,228 | 9/1992 | Irani et al. | 342/64 |
| 5,602,937 | * 2/1997 | Bedrosian et al. | 382/151 |
| 5,642,444 | * 6/1997 | Mostafavi | 382/303 |
| 5,696,838 | 12/1997 | Chiu et al. | 382/159 |

OTHER PUBLICATIONS

*Point Correlation: A Reduced–Cost Template Matching Technique,* W. Krattenthaler et al., Forschungszentrum Seibersdorf, presented at First IEEE International Conference on Image Processing, Nov. 13, 1994–Nov. 16, 1994, Austin, TX.

Mandalia, A.D. et al, "Low–Level and High–Level Correlation for Image Registration", 1990, *IEEE*, pp. 206–208.

* cited by examiner

*Primary Examiner*—Andrew W. Johns
*Assistant Examiner*—Seyed Azarian
(74) *Attorney, Agent, or Firm*—Weingarten, Schurgin, Gagnebin & Hayes LLP

(57) ABSTRACT

A system for digital image recognition which combines sparse correlation with image pyramiding to reduce the number of pixels used in correlation provides effective recognition of a reference image template without exhaustive correlation of all pixels in the reference image template. An optimal sparse pixel set is selected from the pixels of the reference image template by correlating the reference image template against a search image scene which is to be searched. Such a sparse pixel set includes those pixels which are optimal in defining the correlation sensitive features of the reference image template. By terminating the accumulation of sparse pixels at an optimal point, performance is maximized without compromising accuracy of recognition. The resultant optimal sparse pixel set is then correlated against the pixels in the search image scene through a series of transformations to find a match of the reference image template within the search image scene.

33 Claims, 4 Drawing Sheets

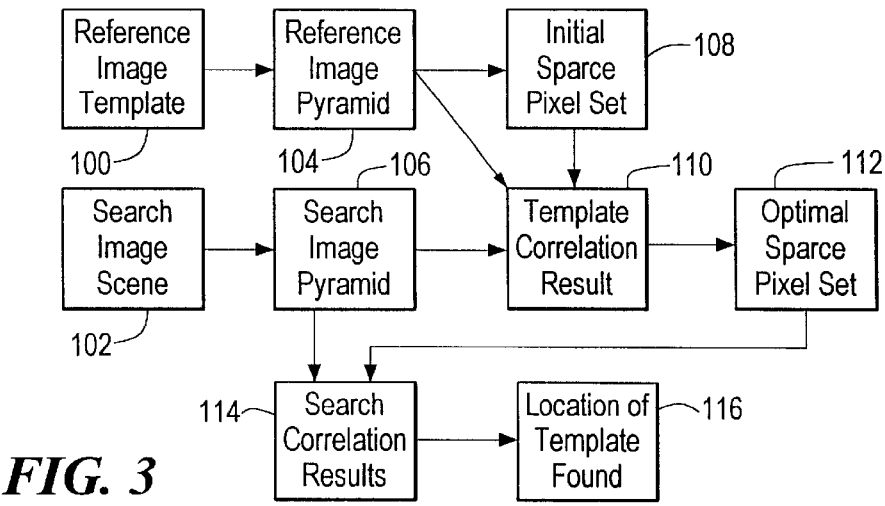
FIG. 3
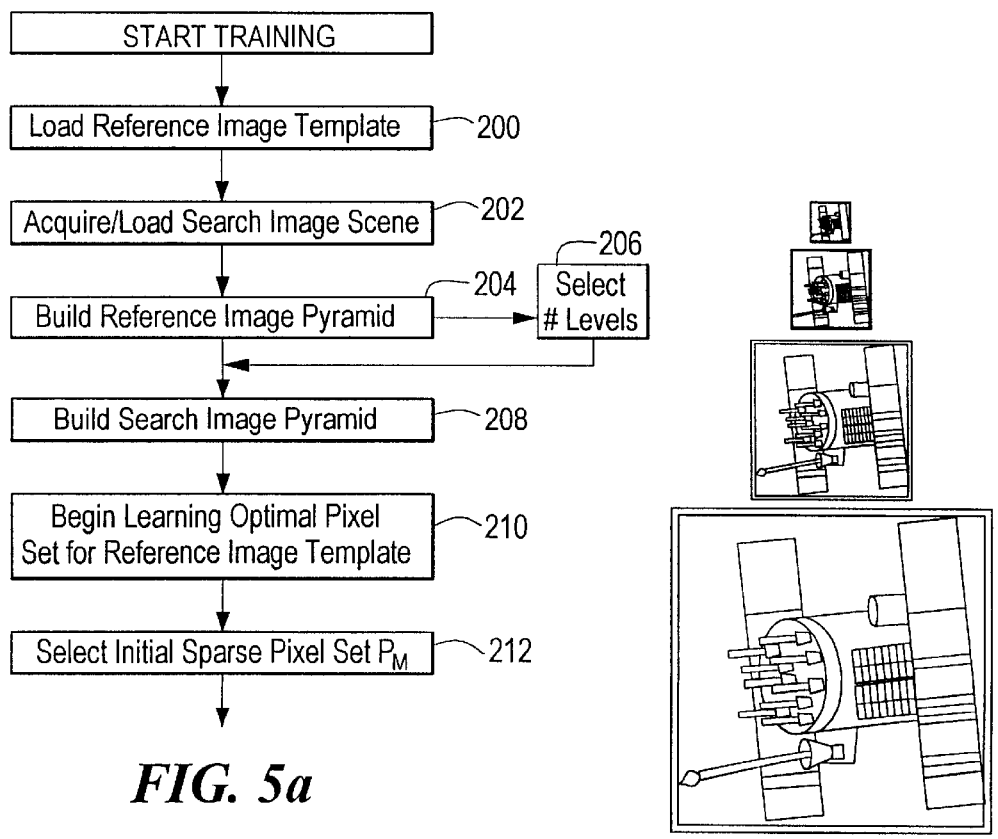
FIG. 5a
FIG. 4

ROTATION AND SCALE INVARIANT IMAGE FINDER

CROSS REFERENCE TO RELATED APPLICATIONS

This application claims priority under 35 U.S.C. 119(e) to U.S. provisional patent application No. 60/085,862, entitled VS FIND TOOL, filed May 18, 1998.

STATEMENT REGARDING FEDERALLY SPONSORED RESEARCH OR DEVELOPMENT

Not Applicable

BACKGROUND OF THE INVENTION

Digital image recognition systems are known which attempt to locate the position of a digital reference image template within a larger digital search image scene. Such digital images are comprised of a series of pixels arranged in a matrix, wherein a grayscale value is attributed to each pixel to indicate the appearance thereof. Matching is then performed by comparing these grayscale values relative to their positions in both the digital reference image template and the digital search image scene. A match is found when the same or similar pattern is found in the digital search image scene as in the digital reference image template.

Such systems are typically implemented in a computer for use in various manufacturing and robotic applications. For example, such systems can be utilized to automate tasks such as semiconductor wafer handling operations, fiducial recognition for pick-and-place printed circuit board (PCB) assembly, machine vision for quantification or system control to assist in location of objects on conveyor belts, pallets, and trays, and automated recognition of printed matter to be inspected, such as alignment marks.

The matrix of pixels used to represent such digital images are typically arranged in a Cartesian coordinate system or other arrangement of non-rectangular pixels, such as hexagonal or diamond shaped pixels. Recognition methods usually require scanning the search image scene pixel by pixel in comparison with the reference image template which is sought. Further, known search techniques allow for transformations such as rotation and scaling of the reference image template within the search image scene, therefore requiring the recognition method to accommodate for such transformations.

As such recognition methods typically scan an image pixel by pixel, and perform a series of transformations of the reference image template, the number of computational operations tends to increase exponentially with the number of elements, or pixels, involved. Such quantification is typically expressed as $O(n^x)$, where x is the power to which the number of computational operations increases based on the number of elements. For example, a sorting method which sorts a list by iterating through the list and comparing it to every other element in the list would be $O(n^2)$, since sorting of 4 elements requires 16 comparison operations, while sorting of 10 elements requires $10^2$, or 100, comparison operations.

As digital image recognition methods tend to require scanning of every pixel in a reference image template with respect to every pixel in a search image scene, the number of operations indicated by $O(n^x)$ becomes significant. Further, since transformations such as rotation and scaling must be repeated for each such pixel scan, $O(n^x)$ is further increased. As an increased number of pixels increases resolution and produces better visual image quality, it is desirable to accommodate a large number of pixels.

Normalized grayscale correlation (NGC) has been used to match digital images reliably and accurately, as is disclosed in U.S. Pat. No. 5,602,937, entitled "Methods and Apparatus for Machine Vision High Accuracy Searching," assigned to Cognex Corporation. The traditional NGC, however, while effective at detecting linear changes in grayscale, has very little tolerance to changes in other aspects of digital images, such as rotation, scale, perspective, distortion, defocus, and non-traditional grayscale changes. In addition, NGC is computationally very expensive, being on the order of ($O(n^4)$), since every pixel in the reference image template needs to be correlated with every pixel in the search image scene.

Following is a general notation for correlation image matching. Let $t(x,y)$, $1 \leq x \leq X_t$, $1 \leq y \leq Y_t$ be the rectangular template to be localized within a larger scene $s(x,y)$. Then the correlation $R(i)$ for a set of N transformations of the scene $s_i(x,y)$, $1 \leq i \leq N$, wherein $s_i(x,y)$ can be a translation, rotation, scaling, or other transformation of $s(x,y)$, can be written as $$R(i) = f(t(x,y), s_i(x,y))$$

where f( ) denotes the correlation function. The most common transformation in template matching is the translation along the x and y directions, or axes. In this case, the displacements $s(x+u, y+v)$ of a symmetric search range $-U \leq u \leq U$, $-V \leq v \leq V$ correspond to $N=(2U+1)*(2V+1)$ transformations $s_i(x,y)$, $1 \leq i \leq N$.

Various approaches have been attempted to speed up conventional NGC, such as faster hardware utilizing pipeline image processing, RISC processors, and faster memory, which allow processing of more pixels per second. Such a horsepower driven approach, however, does not change the ($O(n^4)$) computational metric of NGC.

Another method used to reduce the computational metrics of grayscale correlation is to employ an image pyramid. An image pyramid stores multiple copies of a digital image in a sequence which varies pixel density, and therefore resolution, at each level in the sequence. In this approach, a coarse match is found at the top of the pyramid, and a hill climbing strategy is utilized to traverse through the successive levels of the image pyramid. This approach significantly reduces the number of pixels used in correlation. While effective at improving performance for course matching, such a method must still encompass all the pixels in the reference image template against all pixels in the search image scene.

Yet another strategy is sparse correlation. While the traditional NGC approach applies correlation to every pixel in the reference image template, sparse correlation selects a subset of such pixels for correlation. Each correlation function f( ) incorporates summations $\Sigma_{xy}$ with respect to the x and y axes. For conventional correlation, the summations $\Sigma_{xy}$ for N correlations run over the entire template in an exhaustive search, hence $$\sum_{xy} \equiv \sum_{x=1}^{x_N} \sum_{y=1}^{y_N}$$

For sparse correlation, however, summations are computed only over a predefined set of K pixels $P=\{(x_1,y_1), (x_2,y_2), \ldots, (x_K,y_K)\}$, rather than over an exhaustive set of all reference image template pixels; hence:

$$\sum_{x,y} \equiv \sum_{(x,y)\in P}$$

Since K is much smaller than the total number of pixels in the template, this leads to a significant reduction of computational cost.

Several strategies for choosing a subset have been utilized, such as skipping every other pixel and choosing random pixels. However, these approaches significantly deteriorate the effectiveness of correlation and the resultant matching accuracy.

A version of sparse correlation called point correlation has been proposed (Krattenthaler et al. 1994), where matching is performed with a pre-computed set of sparse points of the reference image template. In this method, a set of correlation sensitive pixels is selected, wherein a pixel of the template is considered to be well suited for point correlation if its influence on template matching is higher than the score of other pixels. This set of correlation sensitive pixels is selected in a learning session during which the template is shifted, rotated, and scaled through a predetermined set of possible combinations.

This learning procedure is outlined as follows. Compute a point set $P_M$ with M initial points by randomly selecting a couple of points, preferably on the edges. Iterate through the pixels in the reference image template to build $P_L$, initially equal to $P_M$:

Assume we have already computed a sparse point set $P_L$ consisting of L points. Then, find the new set $P_{L+1}$ in the following way:
1. For each point $X_j=(x_i,y_i)$ in the template with $X_j \notin P_L$
Compute the correlation result $R_j(i)$ for all transformations i, $1 \leq i \leq N$, using point correlation with the set of points $P_L \cup X_j$.
Compute a correlation measure $Cm_j$ of the correlation result $R_j(i)$ that determines the quality of the point $X_j$.
2. Choose the point $X_j$ to be the new element of sparse point set $P_{L+1}$ whose correlation measure $Cm_j$ is an extremum.

While such a learning procedure improves the performance of the subsequent search, such a procedure is nonetheless computationally expensive. Given that there are O(n) possible combinations (rotations, scale, and others), then N in step 1 would be of $O(n^3)$. If the number of template pixels is of $O(n^2)$, then step one would require $O(n^5)$ computations. To select n pixels, the required number of computations would be:

$(1+2+3+\ldots+n)*O(n^5)$, which is $O(n^7)$.

To select $O(n^2)$ pixels, therefore, the computational complexity would be $O(n^8)$.

However, even with the power of modern processors, $O(n^8)$ is practically infeasible for high resolution images having a large number of pixels. It is therefore desirable to determine an optimal sparse pixel set of correlation sensitive pixels. If the chosen set of sparse pixels is too small, accuracy will be compromised. Conversely, an excessive number of correlation sensitive pixels degrades performance. One method is to simply accumulate a fixed number of points in the sparse point set, however such an approach is not adaptive to various combinations of reference image templates and search image scenes.

It would be beneficial, therefore, to develop a method for computing an optimal sparse pixel set for grayscale correlation matching which is tolerant of changes in rotation, scale, perspective, brightness, and focus, and which is sufficiently fast that it can be implemented in software without requiring dedicated image processing hardware, and which nonetheless maintains a level of accuracy comparable to conventional, exhaustive NGC.

BRIEF SUMMARY OF THE INVENTION

A system for digital image recognition which combines sparse correlation with image pyramiding to reduce the number of pixels used in correlation provides effective recognition of a reference image template without exhaustive correlation of all pixels in the reference image template. An optimal sparse pixel set is selected from the pixels of the reference image template by correlating the reference image template against a search image scene which is to be searched. Such a sparse pixel set includes those pixels which are optimal in defining the correlation sensitive features of the reference image template. By terminating the accumulation of sparse pixels at an optimal point, performance is maximized without compromising accuracy of recognition.

At run-time, the resultant optimal sparse pixel set is then correlated against the pixels in the search image scene, either acquired through a frame grabber and a camera or loaded from writeable media, through a series of transformations to find a match of the reference image template within the search image scene.

A reference image template which represents the image sought, and a search image scene which represents the area to be searched, are constructed in a pixelated grayscale digital image representation. Image pyramids of both the search image scene to be searched and the reference image template are built for use with the correlation process. Next, the search image scene is correlated with a subset of the pixels of the reference image template in a learning procedure to produce the optimal sparse pixel set. During the learning sequence, the reference image template is distinguished from translated, rotated, scaled, and distorted (perspective transforms) instances of itself, other objects, and the background within the defined search image scene. At the end of the learning sequence, the reference image template is associated with an optimal sparse pixel set that is capable of distinguishing the template from any transformed (translation, rotation, scale and perspective distortion) instances of itself, other objects, and the background within the search image scene.

An initial sparse pixel set is determined by selecting a small number of pixels in the reference image template and stored in an optimal pixel accumulator set. Next, the reference image template represented by the optimal pixel accumulator set so far accumulated is correlated against the search image scene to determine a high score. At each location in the search image, the reference image template is transformed through rotation and scaling to determine the transformation having the extremum score. At this location and transformation, the reference template pixels not already in the optimal pixel accumulator set are tested one at a time to become the next optimal pixel to be added to the optimal pixel accumulator set. Each possible tentative optimal accumulator set, after being transformed accordingly to match the transformation that resulted in the extremum score, is correlated against the search image scene. Logic is used to avoid selecting pixels close to or on edges by rotating and scaling the tentative optimal pixel accumulator sets through small amounts. The candidate optimal pixel is determined by the pixel whose inclusion in the optimal pixel accumulator set provides the highest reduction in the previously computed extremum score. This candidate optimal pixel is then added to the optimal pixel accumulator set. Building of the optimal pixel accumulator set terminates when a moving-average of the observed extremum scores exhibits a definite ascending behavior, or trend.

The optimal sparse pixel set obtained from this learning procedure is then utilized in a correlation over the entire search image scene to match the reference image template in the search image scene. As the optimal sparse pixel set contains far fewer points than the original reference image template, computation of the correlation requires consideration of far fewer pixels.

To correlate the reference image template and the search image scene, an image pyramid of the search image scene and the reference image template is built. An exhaustive search is done within the top level pyramid data of the search image scene using the optimal sparse pixel set for the top level of the reference image template pyramid. The exhaustive search includes incremental steps through ranges of all possible translations, rotations and scales. For each transformation of location, rotation and scale, the highest correlation score is kept. At the end of the exhaustive search, all the scores are sorted in descending order. A hill climbing strategy is then utilized starting with the top scoring location, rotation, and scale, and applied to successive pyramid levels. At the full resolution level of the pyramid, additional sparse pixels, selected for additional accuracy, are added to the optimal sparse pixel set from the reference image template, and a second hill climbing operation done in sub-pixel space. If the computed score is greater than the user specified full resolution correlation score, then it is concluded that a match has been found. If not, the next best scoring transformation from the exhaustive search at the top of the pyramid is pursued.

BRIEF DESCRIPTION OF THE SEVERAL VIEWS OF THE DRAWING

FIG. 3 shows a block diagram of the data structures of the present invention; and FIG. 4 shows an image pyramid.

DETAILED DESCRIPTION OF THE INVENTION

Digital image matching as defined by the present invention involves pattern matching the pixels of the reference template image against the pixels of the search image scene to find similar patterns of grayscale and relative position. Correlation of these two images at a given pixel produces a correlation score between 0.0 and 1.0 indicative of the strength of the match, wherein 1.0 is a perfect match. As the reference template image to be found may be translated, rotated, scaled, distorted (perspective), or otherwise transformed in the search image scene, such correlation may not yield a perfect 1.0 score, even for proper recognition.

Figure 1A:
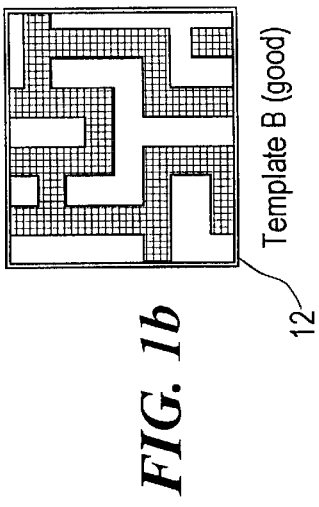
FIG. 1a shows a reference image template having many vertical edges.
Figure 1B:
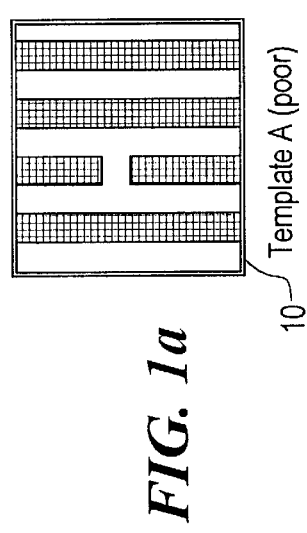
FIG. 1b shows a reference image template having many horizontal and vertical edges.

Defining characteristics of the reference image template serve to indicate the strength of the template as a match candidate. Certain characteristics are more prone to high accuracy of recognition. Referring to FIG. 1a, a poor template 10 having many vertical edges, but few horizontal edges, is shown. This template will be found with a higher accuracy in the horizontal direction than in the vertical direction. On the contrary, FIG. 1b shows a good template having many orthogonal edges, and accordingly would provide high accuracy along both directions.

Figure 2A:
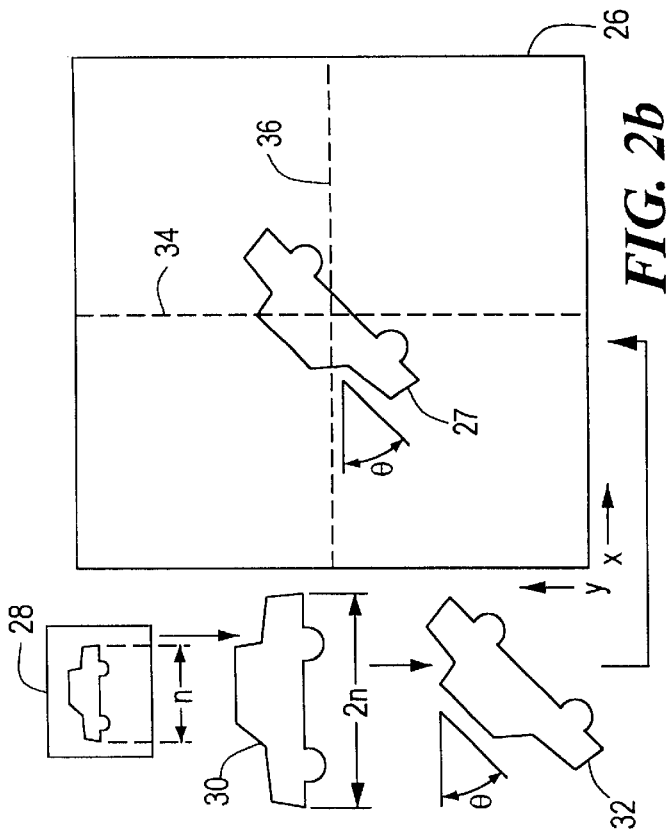
FIG. 2a shows a reference image template in a search image scene.

Referring to FIG. 2a, a reference image template 14 and a search image scene 15 are shown. Top shaded portion 16 is of a different grayscale than bottom portion 18. Searching the search image scene 15 for the reference image template 14 would involve scanning each pixel in the search image scene 15, and applying correlation of the reference image template at each pixel to determine the correlation score. In this example, the matching image 24 is found at the pixel represented by the dotted lines 20 and 22, because that is the location where the extremum correlation score was found.

Figure 2B:
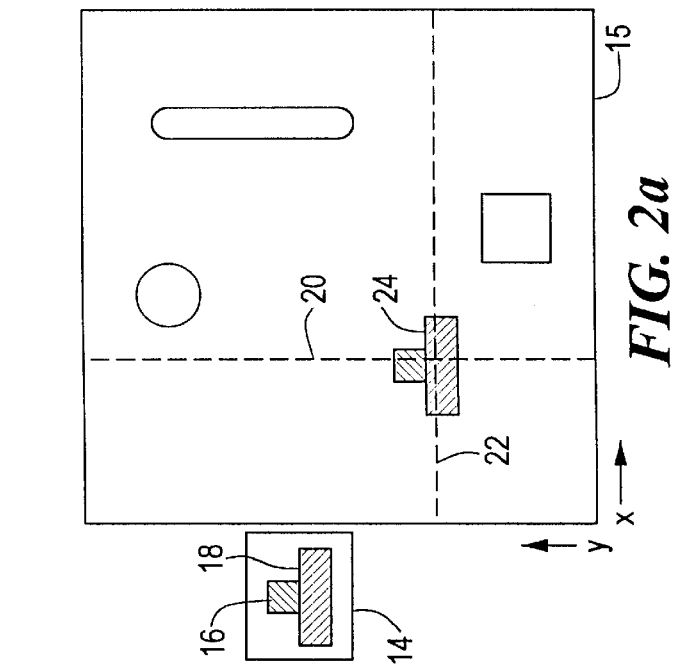
FIG. 2b shows a rotated and scaled reference template image in a search image scene.

Referring to FIG. 2b, a similar matching operation is disclosed with a rotated and scaled image 26. As in FIG. 2a, search image scene 26 is scanned pixel by pixel for the reference image template. As mentioned above, the correlation applied at each pixel also correlates rotated and scaled reference image templates. A matching image 27 is found, after scaling the image 30 by a factor of two and rotating the image 32 by angle θ, at the pixel represented by dotted lines 34 and 36.

FIG. 3 shows a block diagram of the major data structures according to the present invention. A reference image template of an image to be found is obtained 100, along with a search image scene to be searched 102. At 104 and 106 the reference image template and the target image scene, respectively, are transformed into an image pyramid representation for use in correlation.

An image pyramid as is known in the art is shown in FIG. 4. As indicated above, an image pyramid reduces resolution at each level, beginning with a full pixel resolution at the bottom and reducing the resolution at each successive level. Fine details disappear at each level of the pyramid. Higher pyramids contain fewer pixels at the top, increasing performance, however, finer details become obscured at each level of the pyramid. Accordingly, large images with large features can be pyramided higher than images with important fine details. Pyramid height does not affect the accuracy of the search however, since the bottom level contains full pixel detail. A typical pyramid height is four, although it varies depending on the qualities of the reference image template and the search image scene.

An initial sparse pixel set is created at 108, and is then utilized to compute the pixel correlation result 110 by correlating the reference image pyramid 104 and the target image pyramid 106, described in further detail below. During computation of the template correlation result, the optimal sparse pixel set is accumulated 112. This optimal sparse pixel set, rather than the full reference image template used in conventional correlation, is then used for normalized grayscale correlation with the target image pyramid 106 to compute a search correlation result 114, from which the extremum correlation result indicates the position, rotation, and scaling of the reference image template within the search image scene.

Figure 5B:
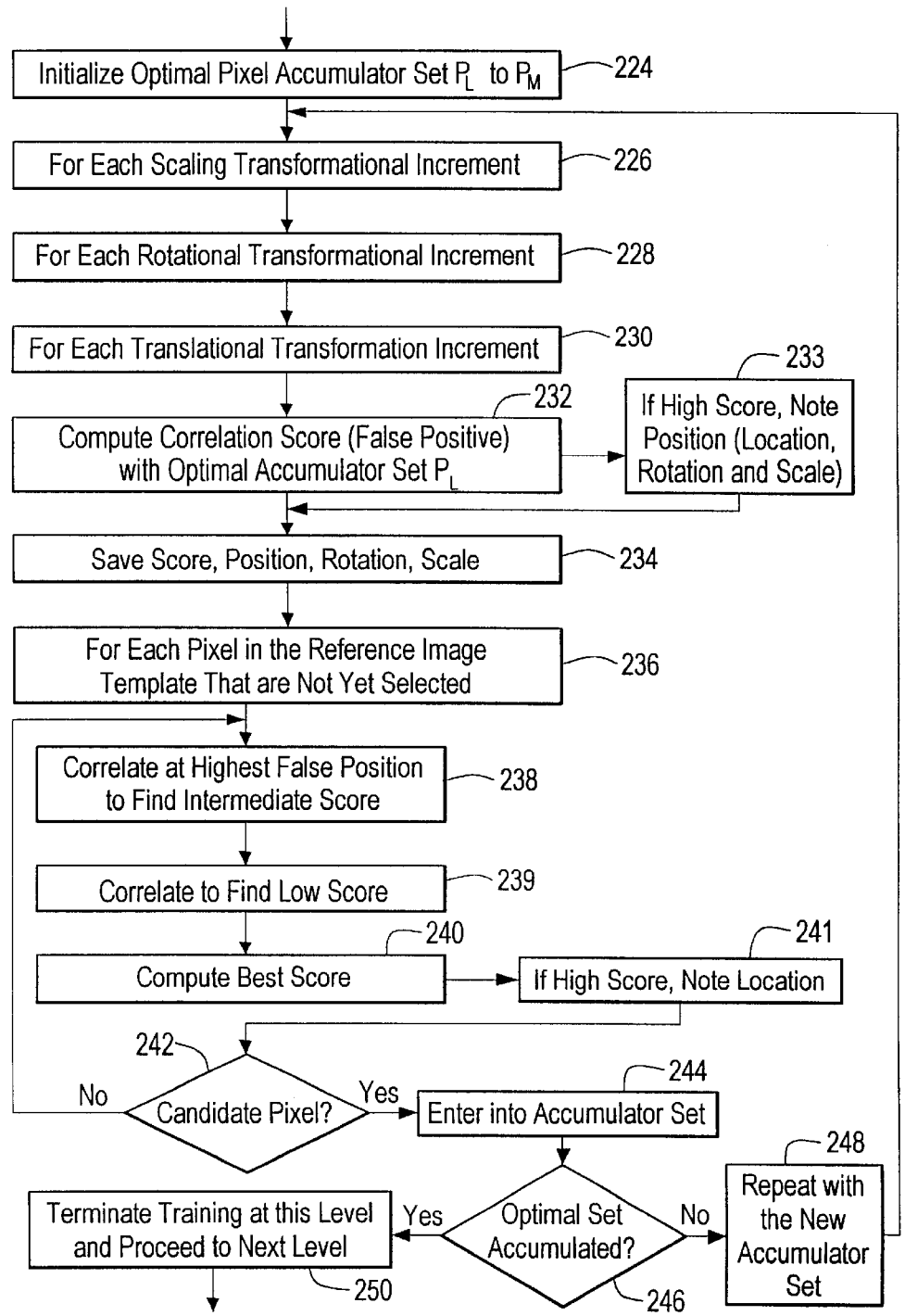
FIG. 5 shows a flowchart of the digital image pattern matching tool and method as defined herein.
Figure 5C:
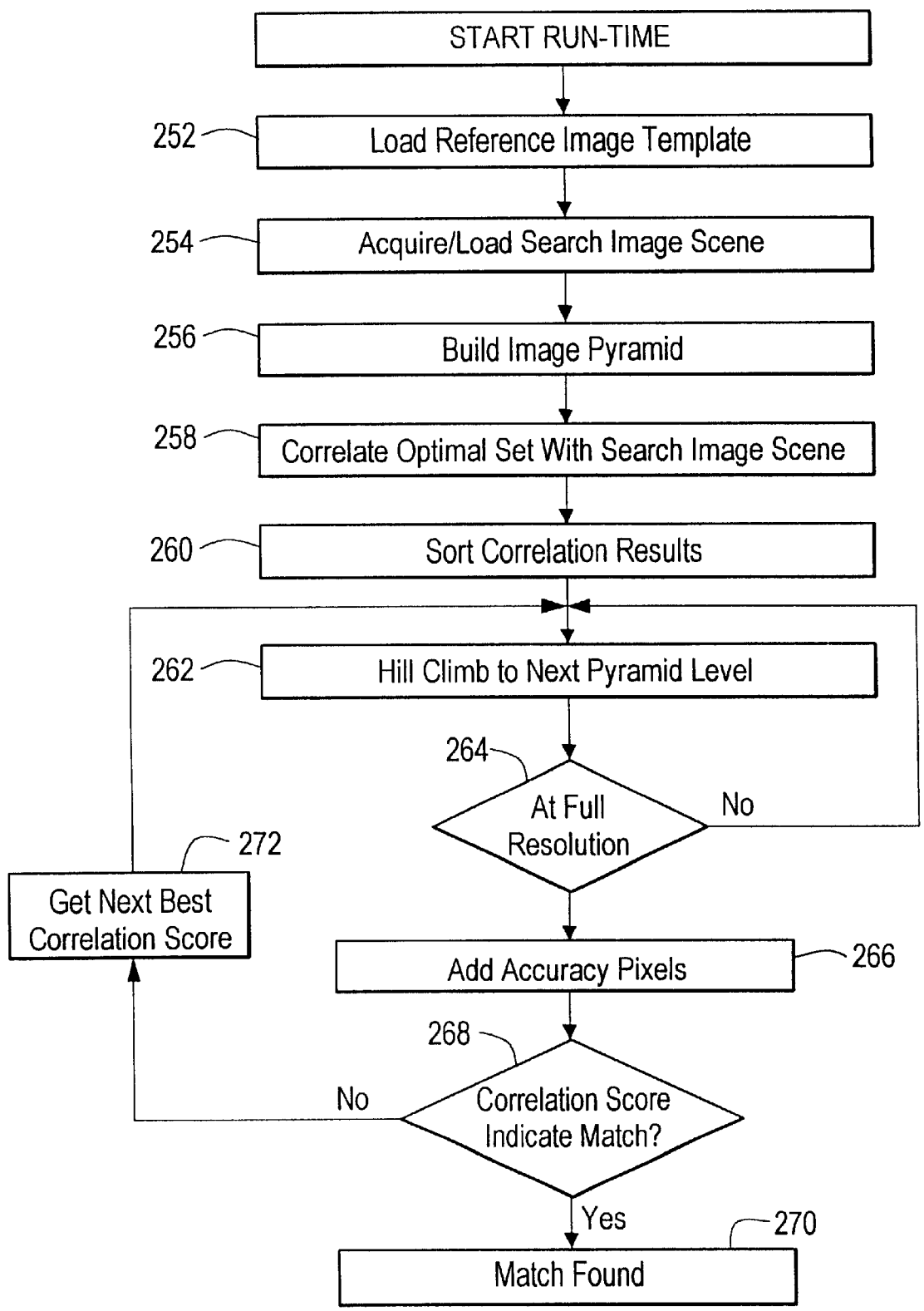

Referring in more detail to FIG. 5, a flowchart of the steps involved in finding a reference image template within a search image scene are shown. As indicated above, there are two procedures in the image finder. The first procedure is a learning procedure used to compute the optimal sparse pixel set. The second procedure is a matching procedure with the optimal sparse pixel set to find the reference image template within the search image scene. Both the learning and the matching procedures are described below.

At step 200, a pixelated grayscale digital image of a reference image template is constructed, by either loading from disk or by extracting a portion of the larger search image scene. At 202, a pixelated grayscale digital image of a search image scene which is to be searched is constructed either by acquiring an image of a scene through a frame grabber and a camera or loading from disk. The pixelated grayscale digital image of the reference image template is then transformed into an image pyramid form at step 204. A number of maximum pyramid levels 206 is specified by a user input, or optionally could be specified by a default value. Then, the appropriate pyramid level is automatically determined by the number of pixels and granularity of details in the pixelated grayscale digital image. A similar pyramid is built to represent the search scene image in step 208. Both of the image pyramids the reference image template and the search image scene abbreviate fine details for faster processing at higher levels, but maintains full detail at lower levels, thereby improving performance without sacrificing accuracy.

At step 210, a learning sequence is begun to determine the optimal sparse pixel set which defines the reference image template. An initial sparse pixel set $P_M$ is determined 212 by selecting three pixels from the reference image template. Pixels indicative of the maximum grayscale and the minimum grayscale are selected, as well as the centermost pixel in the reference image template. Alternatively, other methods could be used to select the initial optimal sparse pixel set, such as selecting two or three random points. This initial sparse pixel set $P_M$ is then used to initialize an optimal pixel accumulator set $P_L$ 224, which will be used to accumulate the pixels which are found to be optimal in defining the correlation sensitive features of the reference image template.

The optimal pixel accumulator set $P_L$ consisting of L points where L=3 is now built. The new set $P_{L+1}$ is found by iterating through a series of transformations of the reference image template at each location in the search scene image to compute the template correlation result (FIG. 3, 110). Areas of the search image scene may be omitted from this correlation search if, for example, the reference image template was actually copied from the search scene image, and therefore would trigger a false correlation match.

In order to build the optimal sparse pixel set, the pixels stored thus far in the optimal pixel accumulator set are correlated with each pixel in the search image scene for all transformations of translation, rotation and scale within a predetermined limit. An iteration through each increment 226 is performed through a range of scaling values, and can be modified to suit a particular application. Within each scale iteration, the reference image transformation is further rotated 228 through a series of angular increments, typically from 0–360. Angular increments may likewise be selected to yield a high correlation match potential.

Starting with the initial optimal pixel accumulator set, the correlation result $R_j(i)$ is computed 230 for all transformations i, $1 \leq i \leq N$, using point correlation 232 with the template $T(x,y)$ as represented by the optimal pixel accumulator set $P_L$ within search image scene $I(x,y)$:

$$R(i) = f(T(x,y), I(x,y))$$

Compute and locate the highest false positive correlation score instance 233. Save the position (x,y), rotation, scale, and correlation score 234 as pixel correlation result 110.

For each pixel $X_j(x_i, y_i)$ in the reference image template 236 with $X_j \notin P_L$, i.e. each pixel not already in the optimal pixel accumulator set $P_L$, compute the correlation score 238 using point correlation with the set of pixels $T(x,y) = P_L \cup X_j$, which are those transformed to saved rotation and scale from step at the pixel in the search image scene $I(x,y)$ having the highest false positive instance using the pixel correlation result 110 from step 234. Save this intermediate score:

$$R(i) = f(T(x,y), I(x,y))$$

Correlate within about ± half the rotational increment° and about half the scaling increment used in step 230 using point correlation and appropriately transformed (rotated and scaled) pixels 239. Note the lowest correlation score.

Now this candidate pixel is tested to determine if it is to be entered into the optimal pixel accumulator set $P_L$. Compute a best score 234 to measure using the following equation: best score=highest false positive score (232)–intermediate score (238)+lowest score (239) and the highest score noted 241. The candidate pixel that results in the highest best score 242 is entered 244 into the optimal pixel accumulator set $P_{L+1}$. If a candidate pixel is not selected for the optimal pixel accumulator set, then the next not yet selected pixel from the reference image template is tested at 238.

If a pixel was entered into the optimal pixel accumulator set, a check is made to determine if the optimal sparse pixel set has been attained 246. When the addition of more pixels does not further discriminate (the observed highest false positive values exhibit an increasing trend) the reference image template from others in the search image scene, then it is concluded that the optimal pixel accumulator set has been attained 250. This check can be done be storing a series of previous scores and determining when the scores are differing by a predetermined amount, such as 0.001. This trend is indicative that the pixels being accumulated in the sparse pixel accumulator set are decreasing in their ability to further distinguish the reference image template. Accordingly, at this stage the accumulator sparse pixel set contains the optimal sparse pixel set. Otherwise, the next candidate pixel 248 is selected by resuming at step 226.

The set of sparse pixels selected at the top of the pyramid are extrapolated for each successive level of the pyramid. At the bottom, or full resolution level, an additional set of sparse pixels are selected for accuracy purposes. This is achieved by limiting the translation to +/–one pixel, rotation to +/–atan(1/radius of the template at the full resolution) in degrees, and scaling to 1+/–1/radius of the reference image template. At this stage, the learning phase is complete, and the optimal pixel accumulator set is saved for run-time search phase.

The computational complexity of building a sparse optimal pixel set in this manner is $O(n^3)$. The optimal sparse pixel set learning method as defined above therefore results in reducing the computational complexity of step one of point correlation from $O(n^5)$ to $O(n^3)+O(n^2)$. Pyramiding, further reduces to $O(n^2)$. Further, all the intermediate correlation results are saved, thereby reducing the $((1+2+3+\ldots+n)*O(n^2))$, to $((1+1+1+\ldots+1)*O(n^2))$. Thus, the computational complexity can be reduced from $O(n^8)$ to $O(n^3)$ over the prior art point correlation learning method.

During the run-time search phase, the reference image template 252 and the search scene image 254 are again transformed into an image pyramid form 256. The saved optimal sparse pixel set is then used to find a match for the reference image template within the search image scene. The transformed (rotation, scale and perspective transformations) optimal sparse pixel set from step 250 is used in conventional normalized grayscale correlation with the search image scene 258. Since the optimal sparse pixel set contains far fewer pixels than the corresponding reference image template, many fewer pixel based operations are required, even though the grayscale correlation remains at $O(n^4)$ complexity. Correlation results for each position in the search image scene are sorted in descending order 260. The pixel (and the corresponding transformation) in the search image scene having the highest correlation score is then considered. A hill climbing strategy is employed 262 to traverse each level of the pyramid of the search image scene until a user specified full resolution level is achieved 264. Accuracy pixels are added 266 as above to further distinguish the optimal pixel set. The set of sparse pixels selected at the top of the pyramid are extrapolated for each successive level of the pyramid. At the bottom, or full resolution level, an additional set of sparse pixels are selected for accuracy purposes 266. This is achieved by limiting the translation to +/−one pixel, rotation to +/−atan(1/radius of the template at the full resolution) in degrees, and scaling to 1+/−1/radius of the reference image template. If the correlation score so computed is greater than a user specified full resolution 268 correlation score threshold, then it is concluded that a match has been found 270. If not, the next highest correlation score from 260 is attempted 272.

Those skilled in the art should readily appreciate that the digital image recognition system as defined above can be delivered to a computer in many forms, including, but not limited to, a) information permanently stored on non-writeable storage media (e.g. read only memory devices within a computer such as ROM or CD-ROM disks readable by a computer I/O attachment, b) information alterably stored on writeable storage media (e.g. floppy disks, hard drives, or other magnetic media), or c) information conveyed to a computer through communication media such as the Internet from remote sources over computer or telephone networks via a modem or other interface. In addition, while the invention may be embodied in computer software, the operations necessary to implement the invention may alternately be embodied in part or in whole using hardware components.

As various modifications and extensions to the present invention as defined herein may be apparent to those skilled in the art, the present invention is not intended to be limited except as indicated by the spirit and scope of the following claims.

What is claimed is:

1. A method of computing an optimal sparse pixel set indicative of a reference image template and adapted for grayscale correlation based digital image pattern matching comprising:

computing an initial sparse pixel set from a subset of said pixels in said reference image template;

initializing, by storing in an optimal pixel accumulator set, said initial sparse pixel set;

correlating said optimal pixel accumulator set with said reference image template and said search image scene to determine a candidate optimal pixel based on a correlation score from the subset of pixels of said reference image template not already in said optimal pixel accumulator set;

storing, in said optimal pixel accumulator set, said candidate optimal pixel if said candidate optimal pixel is highly influential on said correlation score;

building, from among the remaining pixels of said reference image template, said optimal pixel accumulator set by repeating said correlating and said storing;

terminating said building when said accumulator sparse pixel set contains an optimal set of pixels according to predetermined accumulation optimization logic; and storing, in said optimal sparse pixel set said optimal pixel accumulator set.

2. The method of claim 1 wherein said computing of said initial sparse pixel set is preceded by translating said reference image template and said search image scene into an image pyramid form.

3. The method of claim 1 wherein said predetermined accumulation optimization logic further comprises determining which of said pixels are more significant to said correlation score than other pixels already accumulated in said set optimal pixel accumulator set.

4. The method of claim 3 wherein said predetermined accumulation optimization logic further comprises determining when an average of said correlation score changes by a predetermined amount.

5. The method of claim 4 wherein said predetermined accumulation optimization logic further comprises determining when a summation of said correlation scores from among pixels selected for said storing and pixels not selected for said storing increases by a predetermined amount.

6. The method of claim 5 wherein said predetermined amount is about 0.001.

7. The method of claim 1 wherein said pixels having a highly indicative score is determined by pixels having a greater correlation score than other pixels already accumulated in said optimal pixel accumulator set.

8. The method of claim 1 wherein said correlating further comprises transforming said reference image template through a predetermined series of transformations.

9. The method of claim 8 wherein said transforming further comprises rotating and scaling.

10. The method of claim 'wherein said rotating and scaling occur at predetermined intervals along a predetermined range.

11. The method of claim 1 wherein said correlating further includes scanning said reference image template pixel by pixel.

12. A computer program product for use in a computer system adapted for pattern matching of a digital reference image template comprising:

a computer useable medium having computer readable program code adapted for computing an optimal sparse pixel set indicative of a reference image template embodied thereon, said computer program product further including:

computer readable program code for computing an initial sparse pixel set from a subset of said pixels in said reference image template;

computer readable program code for initializing, by storing in an optimal pixel accumulator set, said initial sparse pixel set;

computer readable program code for correlating said optimal pixel accumulator set with said reference image template and said search image scene to determine a candidate optimal pixel based on a correlation score from the subset of pixels of said reference image template not already in said optimal pixel accumulator set;

computer readable program code for storing, in said optimal pixel accumulator set, said candidate optimal pixel if said candidate optimal pixel is highly influential on said correlation score;

computer readable program code for building, from among the remaining pixels of said reference image template, said optimal pixel accumulator set by repeating said correlating and said storing;

computer readable program code for terminating said building when said accumulator sparse pixel set contains an optimal set of pixels according to predetermined accumulation optimization logic; and computer readable program code for storing, in said optimal sparse pixel set said optimal pixel accumulator set.

13. The computer program product of claim 12 wherein said program code further includes code for translating said reference image template and said search image scene into an image pyramid form.

14. The computer program product of claim 12 wherein said program code for predetermined accumulation optimization logic further comprises program code for determining which of said pixels are more significant to said correlation score than other of said pixels already accumulated in said optimal pixel accumulator set.

15. The computer program product of claim 14 wherein said program code for predetermined accumulation optimization logic further comprises program code for determining when a summation of said correlation scores changes by a predetermined amount.

16. The computer program product of claim 15 wherein said program code for predetermined accumulation optimization logic further comprises program code for determining when the average of said correlation score from among pixels selected for said storing and pixels not selected for said storing increases by a predetermined amount.

17. The computer program product of claim 16 wherein said predetermined amount is about 0.001.

18. The computer program product of claim 12 wherein said program code for determining pixels having a highly indicative score determines pixels having a greater correlation score than other pixels already accumulated in said optimal pixel accumulator set.

19. The computer program product of claim 12 wherein said program code for correlating further comprises program code for transforming said reference image template through a predetermined series of transformations.

20. The computer program product of claim 19 wherein said program code for transforming further comprises program code for rotating and scaling said reference image template.

21. The computer program product of claim 20 wherein said rotating and scaling occur at predetermined intervals along a predetermined range.

22. The computer program product of claim 19 wherein said program code for correlating further includes scanning said reference image template pixel by pixel.

23. A method of digital image recognition for finding a reference image template in a search image scene through grayscale correlation matching comprising the steps of:

providing a reference image template represented as a pixelated grayscale digital image;

providing a search image scene represented as a pixelated grayscale digital image;

computing an optimal sparse pixel set indicative of said reference image template by the further steps of:
computing an initial sparse pixel set from a subset of said pixels in said reference image template;
initializing, by storing in an optimal pixel accumulator set, said initial sparse pixel set;
correlating said optimal pixel accumulator set with said reference image template and said search image scene to determine a candidate optimal pixel based on a correlation score from the subset of pixels of said reference image template not already in said optimal pixel accumulator set;
storing, in said optimal pixel accumulator set, said candidate optimal pixel if said candidate optimal pixel is highly correlation sensitive;
building, from among the remaining pixels of said reference image template, said optimal pixel accumulator set by repeating said correlating and said storing steps;
terminating said building when said accumulator sparse pixel set contains an optimal set of pixels according to predetermined accumulation optimization logic; and
storing, in said optimal sparse pixel set, said optimal pixel accumulator set;

locating, within said search image scene, said reference image template by correlating said optimal sparse pixel set with said search image scene.

24. The method as in claim 23 wherein said locating includes scanning said search image scene pixel by pixel.

25. The method as in claim 24 wherein said locating further includes selecting an additional subset of accuracy pixels from said reference image template for inclusion in said optimal sparse pixel set.

26. A computer apparatus for pattern matching of pixelated digital images comprising:

a reference image memory for storing a pixelated reference image template comprising a plurality of pixels in a matrix; and a search scene memory for storing a pixelated search image template comprising a plurality of pixels in a matrix, wherein each of said pixels has a grayscale and a position;

an optimal sparse pixel memory adapted to store a subset of said pixels of said reference image template; and a processor adapted to determine a correlation score of a plurality of pixels, wherein said correlation results are indicative of a pattern match between said reference image template and said search scene image, said correlation results being determined by sequentially copying a plurality of said pixels from said optimal sparse pixel memory and a plurality of said pixels from said search image memory into said processor for comparing said grayscale values and said positions, wherein said pixels are selectively stored in said optimal sparse pixel memory as a result of a correlation score which is highly influential in determining said pattern match.

27. The computer apparatus as in claim 26 wherein said reference image memory and said search scene memory further comprise pyramid image memory adapted to store said pixels in a multilevel pyramid wherein each level of said pyramid has a varying resolution.

28. The computer apparatus as in claim 26 wherein said selective storing of said pixels in said optimal sparse pixel memory is determined by pixels affecting said correlation score such that said pixels are more likely than said pixels in said reference image memory to determine said pattern match.

29. The method as in claim 1 wherein said correlation score is a high false positive score.

30. The method as in claim 1 wherein said predetermined accumulation optimization logic comprises determining when adding additional pixels to said optimal pixel accumulator set does not further discriminate said reference image template from said search image scene.

31. The method as in claim 29 wherein said predetermined accumulation optimization logic comprises determining when said high false positive score exhibits an increasing trend.

32. The method as in claim 9 wherein said transforming further comprises adjusting for perspective distortion.

33. The method as in claim 32 wherein said transforming further comprises horizontal and vertical shifting pixel by pixel.

* * * * *